United States Patent Office 3,307,318
Patented Mar. 7, 1967

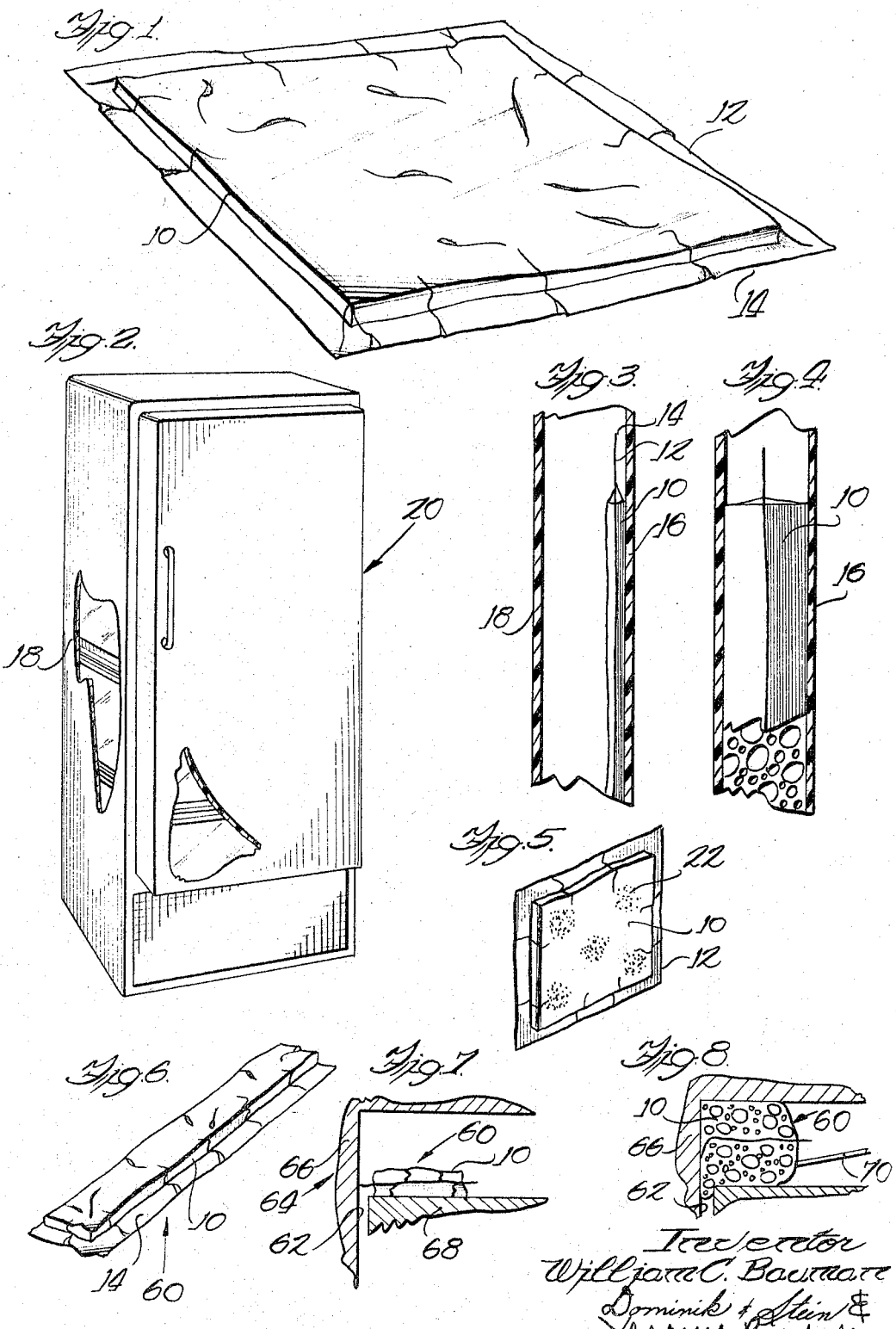

3,307,318
FOAM PLASTIC FILLER METHOD
William C. Bauman, Midland, Mich., assignor to The Dow Chemical Company, Midland, Mich., a corporation of Delaware
Filed Feb. 27, 1964, Ser. No. 347,910
4 Claims. (Cl. 52—743)

This invention relates to a novel method for filling void spaces with synthetic plastic foam and more particularly to a novel method wherein a sealed bag of compressed synthetic plastic foam is used for insulating spaced wall structures, and for filling cracks and voids. This application is a continuation-in-part of application Serial No. 56,364 filed September 16, 1960, now abandoned.

As disclosed in the parent application, a compact package of compressed synthetic plastic foam can be made by compressing a body of foam to a fraction of its normal volume, and then sealing it in a substantially vapor impermeable plastic bag. Such bagging may precede the compression step. Air is expelled from the bag by the application of a vacuum unless the compression substantially expels all the air. The bag is then sealed, preferably by heat sealing. Thereafter, atmospheric pressure outside of the bag maintains the foam in a compressed state. Only when the bag is opened or punctured to allow entry of air will the foam reexpand to its normal volume. By reexpanding the foam, only after the sealed bag has been placed in a useful position, such as in a joint, between spaced walls, etc., unique beneficial results can be obtained with the foam as packaged in accordance with the present application. Such expansion in situ will act to completely fill the void. The foam has insulation value and by opening or puncturing the bag with simultaneous introduction of a gas which also has an insulative characteristic, the insulation value is further enhanced. And, by applying adhesive to the outside of the bag prior to placement within the void being filled, the bagged foam is thereafter retained in a fixed position with respect to the void. Also, the bag provides a moisture-proof covering over the foam and may act as a support for subsequent application of caulking, etc.

An object of this invention is to provide a unique method for filling void spaces with synthetic plastic foam.

Another object is to provide a unique method for insulating spaced wall, ceiling or floor structures.

A further object is to provide novel insulation material.

A still further object is to provide novel caulking material.

Another object is to provide insulation material wherein the gas or vapor surrounding said material enhances the insulation value of said material.

Another object is to provide insulation and caulking material which is moisture resistant.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

Broadly, the invention comprises a utilization of the uniquely packaged plastic foam of the parent application, Serial No. 56,364 filed September 16, 1960, in a manner wherein the packaged foam is inserted into the void to be filled and then the bag is opened or punctured to permit expansion of the foam. Such expansion causes complete filling of the void, and in addition, the bag acts as a protective layer for said foam to prevent soiling or deterioration of the foam due to adverse moisture or vapor environments coming into contact therewith. If desired, an adhesive may be applied to the bag prior to its placement within the void so that upon expansion of the foam within the bag, the adhesive will be forced into intimate contact with the boundary walls of the void and thereafter retain the bagged expanded foam in position. A further refinement involves the use of a gas which has a beneficial effect, such as Freon, for promoting and enhancing the insulative characteristics of the foam, an inert gas for prolonging the aging characteristics of the foam, and similar beneficial treatments.

As illustrated in the attached drawings (FIGS. 3 and 4) the foam 10, as it exists compressed within sealed bag 12, is inserted between the inner and outer walls 16 and 18, respectively, of refrigerator 20 during its manufacture. Adhesive 22 is preferably applied to the outside surface of the bag prior to such insertion so that it will hold itself in place within the walls during manufacture of the refrigerator. The bag is subsequently punctured to permit expansion of the foam (see FIG. 4) whereby the latter will act as insulation.

As illustrated in FIGS. 6, 7 and 8, the use of a sausage-shaped bag 60 for filling voids 62 within a building structure is also possible. Here, the expansion of the foam causes complete blocking of the void 62.

For a fuller understanding of the nature and objects of the invention, reference should be had to the following detailed description taken in connection with the accompanying drawing in which:

FIG. 1 is a perspective top view of a sealed bag of compressed synthetic plastic foam.

FIG. 2 is a broken perspective view of a refrigerator which has been insulated with the bag packaged foam of FIG. 1.

FIGS. 3 and 4 are cross-sectional sequential views of the wall of the refrigerator of FIG. 2 illustrating the manner of placement of the bagged foam and its subsequent expansion in situ between the inner and outer walls of the refrigerator.

FIG. 5 illustrates the application of adhesive to the bag prior to insertion between the inner and outer walls of the refrigerator of FIG. 2.

FIG. 6 is a perspective view of a sausage-shaped bag of compressed foam for use as caulking.

FIGS. 7 and 8 are sequential cross-sectional views of a building structure illustrating the placement of a sausage-shaped bag of plastic foam and subsequent puncturing to fill a void within a building structure.

Similar reference characters refer to similar parts throughout the several views of the drawing.

As seen in FIGS. 1 and 6, the bag packaged compressed foam consists of a slab of foam 10, in compressed condition, within a sealed plastic bag (12 in FIG. 1 and 60 in FIG. 6). Subatmospheric pressure exists within the bag so that atmospheric pressure outside of the bag will retain the foam in a compressed state. It is preferred that there be substantially no moisture content within the bag as this would detract from the ability of atmospheric pressure to compress the foam.

FIGS. 2–5 illustrate the unique method involving use of the bag packaged compressed foam of FIG. 1. The cross-sectional views of FIGS. 3 and 4 illustrate the steps of the method, to wit: inserting the bag, after it is painted with adhesive 22 (see FIG. 5) between the inner and outer walls 16, 18 of refrigerator 20, and preferably adhered to a wall such as inner wall 16. Subsequently, the bag is opened or punctured. This permits entry of air into the bag and the compressed foam, of its own volition, then reexpands into its natural shape to fill the space between the spaced inner and outer walls 16 and 18. The expanded foam thereafter acts as insulation. If desired, the puncturing of the bag may be accomplished with a hypodermic needle which is connected to a supply of an insulative gas, such as Freon. The gas will supplement the insulation value of the foam.

As noted in FIG. 5, adhesive 22 is applied to the outside of the bag 12 prior to use. This causes adherence of the bag to the walls 16 and 18 of the refrigerator after expansion of the foam. Thus, during use of the refrigerator, there will be no shifting or settling of the insulation therein to cause a loss of the insulation factor.

It should also be noted that since bag 12 remains as a covering over the foam after it expands, it will act as a protective layer. In the event that moisture or liquid seeps into the wall enclosed space, it will nevertheless be excluded from contact with the plastic foam. Therefore, the latter will retain its original foamed condition and will not settle by reason of the added weight of the moisture or liquid which has entered the wall enclosed space. Furthermore, the bag will act to protect the foam from deleterious atmospheres which may degrade or harden the foam.

FIGS. 6, 7 and 8 illustrate the use of a sausage-shaped bag 60 of compressed foam 10 to fill a void 62 in a building structure 64. As seen, the foam takes the shape of a long strip of compressed plastic foam 10 within a plastic bag 60 sealed at 14. Prior to use, the outside surface of the sausage-shaped bag 60 is painted with an adhesive. It is then inserted adjacent the void 62, preferably between walls 66 and 68. The bag is then punctured with a needle or nail 70 to permit entry of air into the bag and the compressed foam, of its own volition, reexpands into its natural shape. In so doing, the foam enters into void 62 to fill the space. The adhesive that was placed on the outside of the sausage-shaped bag 60 maintains the body of foam at the location indicated between walls 66 and 68 so that there is no subsequent opening of the void. If desired, a caulking material may be applied directly on top of the sausage-shaped bag 60 because the impervious nature of the plastic film utilized in making the bag can tolerate the substances of the caulking composition. In addition, as seen in FIG. 8, the expanded foam within the bag 60 presents a neat appearance of its own accord, and the builder could very easily paint directly over the bag.

In certain instances, it might also be desirable to puncture the sausage-shaped bag 60 with a hypodermic needle (not shown) whereby an insulative gas or other useful gas may be inserted into the bag.

It should also be evident that the manner of use of the bag of compressed foam may be utilized for filling voids and similar undesirable spaces in a variety of structures. In addition, it should be noted that a continuous roll formed of sausage-shaped bags of a convenient length can be linked together, preferably by the excess film at opposite sealed ends 14 of the bags. Thus, as the roll is unwound for use, that portion which is to be used at the moment can be cut off of the roll without expansion of the rest of the roll.

It will thus be seen that the objects set forth above, among those made apparent from the preceding description, are efficiently attained, and since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method for filling a space in a wall structure formed of spaced walls with synthetic plastic foam comprising the steps of placing a sealed vapor impermeable plastic bag containing synthetic plastic foam in a compressed state by reason of atmospheric pressure on said bag into said wall structure, said bag being substantially larger than said foam and subsequently puncturing said bag with a sharp object to permit re-expansion of said foam, of its own volition, whereby said wall structure is filled with foam.

2. A method for filling a space in a wall structure formed of spaced walls with synthetic plastic foam comprising the steps of applying adhesive to the outside of a sealed vapor impermeable plastic bag containing synthetic plastic foam in a compressed state by reason of atmospheric pressure on said bag, said bag being substantially larger than said foam, placing said bag into said wall structure and subsequently puncturing said bag with a sharp object to permit re-expansion of said foam, of its own volition, whereby said wall structure is filled with foam and said bag adheres to said wall structure.

3. A method for insulating a structure having an inner and an outer wall comprising the steps of applying adhesive to the outside of a sealed, substantially moisture free vapor impermeable plastic bag containing synthetic plastic foam in a compressed state by reason of atmospheric pressure on said bag, said bag being substantially larger than said foam, placing said bag into said wall structure and subsequently puncturing said bag with a sharp object to permit re-expansion of said foam, of its own volition, whereby said wall structure is filled with foam and said bag adheres to said wall structure.

4. The method of claim 3 utilized for insulating the wall structure of a refrigerator.

References Cited by the Examiner

UNITED STATES PATENTS

| | | | |
|---|---|---|---|
| 1,942,162 | 1/1934 | Campbell | 161—407 |
| 2,106,840 | 2/1938 | Gould | 156—79 X |
| 2,226,617 | 12/1940 | Kuenzli | 52—743 |
| 2,551,751 | 5/1951 | MacDougall | 156—71 X |
| 2,613,862 | 10/1952 | Vaughn | 206—46 |
| 2,971,616 | 2/1961 | Bayley | 161—43 |

ALEXANDER WYMAN, *Primary Examiner.*

W. A. POWELL, *Assistant Examiner.*